(12) United States Patent
Thomann et al.

(10) Patent No.: US 11,290,035 B2
(45) Date of Patent: Mar. 29, 2022

(54) METHOD AND DEVICE FOR DETERMINING A ROTATION VARIABLE

(71) Applicant: BROSE FAHRZEUGTEILE SE & CO. KOMMANDITGESELLSCHAFT, BAMBERG, Bamberg (DE)

(72) Inventors: Christian Thomann, Burgebrach (DE); Detlef Russ, Ebersdorf (DE); Guido Naumann, Allendorf (DE); Christoph Brand, Memmelsdorf (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 16/753,502

(22) PCT Filed: Sep. 25, 2018

(86) PCT No.: PCT/EP2018/075956
§ 371 (c)(1),
(2) Date: Apr. 3, 2020

(87) PCT Pub. No.: WO2019/068517
PCT Pub. Date: Apr. 11, 2019

(65) Prior Publication Data
US 2020/0295678 A1    Sep. 17, 2020

(30) Foreign Application Priority Data

Oct. 4, 2017 (DE) .................... 10 2017 217 626.1
Mar. 23, 2018 (DE) .................... 10 2018 204 531.3

(51) Int. Cl.
*H02P 6/14* (2016.01)
*H02P 6/00* (2016.01)

(52) U.S. Cl.
CPC .......... *H02P 6/007* (2013.01); *H02P 2203/03* (2013.01)

(58) Field of Classification Search
CPC .... H02P 6/007; H02P 7/0094; H02P 2203/03; H02P 29/50; G05B 2219/45242
See application file for complete search history.

(56) References Cited

U.S. PATENT DOCUMENTS

2011/0050031 A1* 3/2011 Gebregergis ........... H01R 39/40
310/242

FOREIGN PATENT DOCUMENTS

| DE | 102007013711 A1 | 9/2008 |
|---|---|---|
| DE | 102008000618 A1 | 9/2009 |
| DE | 102009036274 A1 | 4/2010 |
| DE | 10200902654 A1 | 10/2010 |

(Continued)

*Primary Examiner* — Karen Masih
(74) *Attorney, Agent, or Firm* — Brooks Kushman, P.C.

(57) ABSTRACT

A method for determining a rotation variable of a rotatably mounted rotor of a mechanically commutated electric motor, having a motor current path formed between two brush elements of the electric motor, and leading via the commutator bars contacted by the brush elements, and via coil windings of the rotor electrically connected to said commutator bars, wherein an oscillating input signal is fed into the motor current path and the rotation variable is determined with the aid of a ripple of a resultant output signal, said ripple being due to the mechanical commutation of the motor current path.

19 Claims, 3 Drawing Sheets

(56) References Cited

FOREIGN PATENT DOCUMENTS

| | | |
|---|---|---|
| DE | 102009026448 A1 | 12/2010 |
| DE | 102009026520 A1 | 12/2010 |
| EP | 2246970 A2 | 11/2010 |
| JP | 2011176944 A | 9/2011 |
| KR | 20170007526 A | 1/2017 |
| WO | 2015071974 A1 | 5/2015 |

* cited by examiner

METHOD AND DEVICE FOR DETERMINING A ROTATION VARIABLE

CROSS-REFERENCE TO RELATED APPLICATIONS

This application is the U.S. National Phase of PCT/EP2018/075956 filed Sep. 25, 2018, which claims priority to DE 10 2017 217 626.1 filed Oct. 4, 2017 and DE 10 2018 204 531.3 filed Mar. 23, 2018, the disclosures of which are hereby incorporated in their entirety by reference herein.

TECHNICAL FIELD

The present disclosure relates to a system and method of operating same, to determine a rotation variable of a rotatably mounted rotor of a mechanically commutated electric motor.

BACKGROUND

Motor vehicles are typically equipped with electromotive adjustment drives which can open and close adjusting parts, such as side windows and/or a sunroof, for example. Moreover, motor vehicles also often have seats with an electromotive seat adjustment. In vehicle seats, the respective adjusting part is moved by utilizing a drive which is operated by the electric motor. The drive is often designed in particular in the form of a worm drive with a (drive-side) worm on a motor shaft and with a (drive-side) worm wheel.

SUMMARY

In this case, determining the rotation variable (rotor position, rotor speed) disadvantageously depends on the load current or the motor current. In other words, it is not possible to make a determination when the electric motor is in the de-energized state. In order to make determinations relating to position and/or speed, it is therefore necessary, for example, to store a motor model in a controller and to operate the electric motor using this motor model in operating situations in which there is a low load current and/or correspondingly low motor speeds.

The underlying object of the disclosure is to specify a particularly suitable method for determining a rotation variable of a rotatably mounted rotor of a mechanically commutated electric motor. In particular, a configuration should be specified which is as simple as possible in terms of construction, by which it is possible to determine the rotation variable in a reliable manner, even in the case of a low load current or motor current. A further underlying object of the disclosure is to specify a device which is suitable for a method of this type.

According to one embodiment of the present disclosure, a method of determining a rotation variable of a rotatably mounted rotor of a mechanically commutated, i.e. brushed, electric motor is provided. The electric motor may be an adjustment drive of a motor vehicle, for example, that may be used to move an adjusting part along an adjustment path. In this case, the electric motor may include commutator as well as brush elements that may brush over commutator segments of the commutator during operation of the motor. In other words, the electric motor may be a brushed commutator motor. In this case, the brushes or brush elements are part of a brush system of a stator, and the commutator is part of a rotor of the electric motor. As an example, the rotor may be rotatably mounted relative to the stator. The rotor may be provided with an electromagnetic structure that may be provided with a number of coil windings (armature winding, rotor winding) that may form the electromagnets. As an example, a first and second coil end of each coil winding is guided respectively to two commutator segments of the commutator.

A motor current path may be formed between two brush elements of the electric motor, and may be guided by commutator segments, that may contact brush elements, and coil windings of the rotor which are connected to these commutator segments in an electrically conductive manner. As an example, the present disclosure recognizes that the impedance or the inductance of the coil windings may be changed by commutation.

In one or more embodiments, an oscillating input signal may be fed into to a parallel connection of the motor current path and of the radio interference suppression path. In this case, the input signal is fed into the motor current path as an armature current signal, for example. In this case, the input signal is in particular an additional current signal which is fed into the motor current path with or alternatively to the direct current-like motor current or load current. The impedance or the inductance of the motor current path may vary depending on the commutation state. The rotation variable may be established based on a current ripple of a resulting output signal, and the current ripple may be caused by mechanical commutation of the motor path. As a result, a particularly suitable method for determining a rotation variable may be realized. For example, by feeding in the input signal, the rotation variable may be established. The rotation variable may include rotor position or rotor speed, even when the electric motor is in the de-energized state, in which state no or only a very low motor current or load current flows.

According to one or more embodiments, the load current and/or motor current may not be used to determine the rotation variable. As such, the method may be used when the electric motor is at a standstill or in the de-energized state. Because of two different impedance values or inductance values, it may be possible to determine the commutation states, and thus the rotation variable, as a variation of the signal amplitude (current ripple, ripple) of the output signal.

As an example, the resulting current of the output signal is determined via a resistance, for example, wherein the two commutation states are distinguished based on a different voltage drop. The rotation variable, i.e. the rotor position and/or rotor speed, may then be established based on this voltage drop. In contrast to the prior art, it is not the current ripple of the load current that is evaluated, but instead the current ripple of the alternating current-like output signal. The current ripple of the output signal may also be described as a high frequency current ripple (HF current ripple, HF ripple).

The output signal may be evaluated by utilizing a relative determination, i.e. an amplitude measurement between the two possible commutation states. A relative determination of this type may suppress the effects and influences of component tolerances. Thus, the method may be substantially immune to component tolerances of the electric motor or the drive. Moreover, it may be possible to evaluate the output signal in a relatively simple and software-technical manner.

Alternatively, the motor current or load current may also be designed as an alternating current. However, the alternating current may have a low alternating current frequency in comparison to the input signal. For example, the motor current or load current is generated by a pulse width modulation and may have a frequency of 20 kHz, for example, and the input signal may have a substantially greater measuring frequency that may be approximately 500 kHz. The motor current or load current and the input signal or the output signal may have frequencies that may differ from one another, so that they may be easily distinguished from one another during evaluation.

In another embodiment of the present disclosure, a radio interference suppression path that may be provided with a capacitance or may have a capacitor that may be configured to reduce interference may be connected in parallel to the motor current path. This configuration may be useful because the motor current path and the radio interference suppression path of the electric motor form an electrical parallel resonant circuit. This parallel resonant circuit is excited by the input signal, and different resonance frequencies may be present depending on the commutation state. Because of the two different resonance frequencies, it may be possible to determine the commutation states, and thus the rotation variable, as a variation of the signal amplitude (current ripple, ripple) of the output signal in a reliable and fail-safe manner.

In one or more embodiments, the oscillating input signal may have a measuring frequency at which the amplitude of the current ripple of the output signal is greatest. In order to establish the measuring frequency, it is conceivable that when the electric motor is at a standstill, circuit parameters and/or measuring parameters are optimized for establishing the rotation variable, for example. As an example, a phase-modulated test signal is fed into the parallel resonant circuit as an input signal for this purpose. In this case, it may be possible to specify the optimum operating points with the help of the phase shifts of the input and/or output signal. In this case, a number of different test signals with different phase shifts may be successively fed in, one after the other, and the operating point may be established from a maximum amplitude difference of the output signal for the different commutation states. The measuring frequency of each test signal or input signal may be selected in a wide frequency range.

The measuring frequency may have a frequency value that may be higher than rotation frequencies of the electric motor that may occur during operation. As an example, the measuring frequency may have a frequency value that may be one or two orders of magnitude higher than the motor frequency. For example, the electric motor has a rotation frequency or motor frequency of approximately 1 kHz when the motor is being operated. In this case, the measuring frequency can be suitably established in a wide frequency range, for example between 350 kHz and 800 kHz. In this case, the measuring frequency is set at approximately 550 kHz, for example. The HF current ripple of the output signal can thus be distinguished from the load current or motor current in a reliable manner.

In order to improve the electromagnetic compatibility (EMC) of the electric motor, the measuring frequency may be switched alternately between a plurality of frequency values during operation of an electric motor. The measuring frequency may be selected over a wide frequency range within which the amplitude of the current ripple of the output signal, i.e. the amplitude difference between the two commutation states, is approximately constant. By changing the frequency values of the measuring frequency, it may be possible to switch to improve the EMC of the electric motor without substantially influencing the current ripple of the output signal.

In one possible development of the design, it is conceivable to switch between three or four frequency values in a temporally synchronized manner and/or with the help of a number of motor revolutions, for example.

In one possible configuration of the method, the input signal may be generated as a sequence of measuring pulses. In other words, the input signal is designed as a bit sequence of single, pulse-width-modulated measuring pulses, for example. As a result, a particularly suitable method for determining the rotation variable is realized.

One additional or further aspect of the disclosure makes provision for the output signal for establishing the rotation variable to be guided via a high-pass filter to a digital pin of an evaluation unit. As a result, it is not necessary for the evaluation unit to have an additional analog digital converter (ADC). The output signal or rather the signal edges imposed by the rotor rotation can thus be directly detected by being fed into the digital pin, and, as a result, the rotation variable can be established. In this way, the available hardware resources are used more effectively and the quality of the signal evaluation is improved.

In this case, a "digital pin" is intended to be understood to mean in particular a digital input pin, i.e. an input contact or contact pin of the evaluation unit which is designed as a microcontroller, for example, which digital input pin is suitable and equipped for receiving digital signals. Thus, the signal edges of the (filtered) output signal are directly converted by utilizing the digital pin into digital switching edges for processing and establishing the rotation variable.

The evaluation time for establishing the rotation variable is reduced by using a digital pin, whereby maximum values of the rotation variable, in particular the maximum value of the speed, can also be detected in a reliable manner. In this case, a digital pin which is capable of interrupting may be used, i.e. a pin which triggers a specific (interrupt) routine as soon as its status changes, whereby the performance of the evaluation unit is improved.

In one conceivable embodiment, it is advantageous if, for example, when a threshold value of the rotation variable is reached or if it falls short, for example if a rotational speed limit falls short, an existing ADC channel of the evaluation unit is activated to convert the output signal. As a result, it is possible to determine and establish the rotation variable in a particularly reliable manner, even in a currentless state.

In this case, it is possible that the ADC channel is also shared by multiple instances of evaluation units or control units, depending on current requirements for individual units, which thus reduces the requirements for ADC channels which are usually available in small numbers.

Alternatively or additionally to the high-pass filter, it is conceivable for two or more digital pins to be interconnected to form an resistor ladder (R2R) network, for example, making a higher resolution of the output signal possible.

The device according to the disclosure is suitable and equipped for determining the rotation variable of the rotatably mounted rotor of the mechanically commutated electric motor. In this respect, the device has a measuring circuit which has a signal generator, which is capacitively coupled to one of the brush elements and which is for generating the input signal, and an evaluation unit, which is capacitively coupled to the other brush element and which is for evaluating the output signal. The measuring circuit also has a controller, i.e. a control apparatus, which is suitable and equipped for carrying out the method described previously.

In this case, the controller is generally equipped to carry out the previously described method according to the disclosure in terms of program and/or circuitry. The controller is thus specifically equipped to generate an oscillating input signal with a measuring frequency by utilizing the signal generator, and to establish the rotation variable by utilizing the evaluation unit with the help of the HF current ripple of the output signal.

In one configuration, the controller is formed at least in its core by a microcontroller with a processor and with a data store in which the functionality for carrying out the method according to the disclosure is implemented in a program-technical manner in the form of an operating software (Firmware), so that the method—optionally in interaction with a motor vehicle user—is carried out automatically when running the operating software in the microcontroller.

However, within the framework of the disclosure, the controller can alternatively also be formed by a non-programmable electronic component, for example an application-specific circuit (ASIC), in which the functionality for carrying out the method according to the disclosure is implemented with circuitry.

In one possible embodiment, it is conceivable that the controller is part of a motor electronics system which controls and/or regulates the electric motor, for example.

The capacitive coupling of the signal generator and the evaluation unit to the motor current path guarantees that the alternating current of the input signal or output signal is decoupled from the load current or motor current in a reliable manner. In this case, the capacitive coupling may be configured in such a way that the comparatively high frequency alternating currents of the input signal and output signal can substantially pass unhindered, and the direct current of the load current or motor current is blocked in a reliable and fail-safe manner. It is thus guaranteed that only the output signal is determined by the evaluation unit. This thus improves the determination of the rotation variable.

In one suitable embodiment, a radio interference suppression path with a capacitance or a capacitor for reducing interference is connected in parallel to the motor current path. The measuring circuit is advantageously connected in the region of the thus formed parallel resonant circuit. In one embodiment, the measuring circuit is here decoupled in a signal-technical manner from a direct current circuit of the electric motor by utilizing a direct current decoupling, which direct current circuit is guided to the brush elements. The direct current decoupling prevents the alternating current of the input signal or output signal from being coupled into the direct current circuit of the electric motor. In other words, the electrical alternating current of the input signal and output signal is limited to the measuring circuit and thus the motor current path and the radio interference suppression path in terms of circuitry.

In one suitable configuration, the direct current decoupling is designed as a longitudinal choke which has a barrier effect in the range of the measuring frequency of the input signal. In other words, the longitudinal choke forms a frequency filter which allows the direct current-like motor current or load current to substantially pass unhindered, and which reliably attenuates for high frequency current components, in particular in the range of the measuring frequency of the input signal and output signal.

In one possible embodiment, the output signal is guided via a high-pass filter to a digital pin of the evaluation unit. As a result, a particularly high-quality and circuit-reduced evaluation of the output signal is made possible.

BRIEF DESCRIPTION OF THE DRAWINGS

An exemplary embodiment of the disclosure is explained in greater detail below using drawings. Within the simplified and schematic depictions.

Mutually corresponding parts and measurements are always provided with the same reference symbols in all figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The electric motor may be a brushed electric motor or a mechanically commutated electric motor. Electric motors of this type have a commutator with (commutator) segments as well as at least two brush elements, of which a commutation and subsequently a reversal of electrical polarity of coil windings of a rotor of the electric motor takes place. The brush elements, which may be produced from compressed coal dust, are arranged around the central commutator and are located in corresponding quivers. In this case, the brushes are pressed against the commutator in a spring-loaded manner, so that an electrical rubbing contact or sliding contact may be guaranteed between the brushes and the commutator segments coated therewith during operation of the motor.

The electrical (armature) resistance of the electric motor increases when the electrical contacting of the brush elements shifts to the commutator segments which follow respectively in the direction of rotation. As a result, the electrical current (motor current, armature current) which flows through the electric motor decreases at this point. This continues until the brush elements are once again electrically contacted with only a single one of the commutator segments respectively, owing to the rotation of the commutator or the rotor. This periodical increasing and decreasing of the resistance imposes an alternating current component on the motor current. In this case, this alternating current component, which is also described as a "current ripple" or "ripple current", is often used to establish a rotation variable, such as in particular the rotor position or the rotor speed, of the rotor. In this case, the current ripple is usually determined at a shunt resistor.

Figure 1:
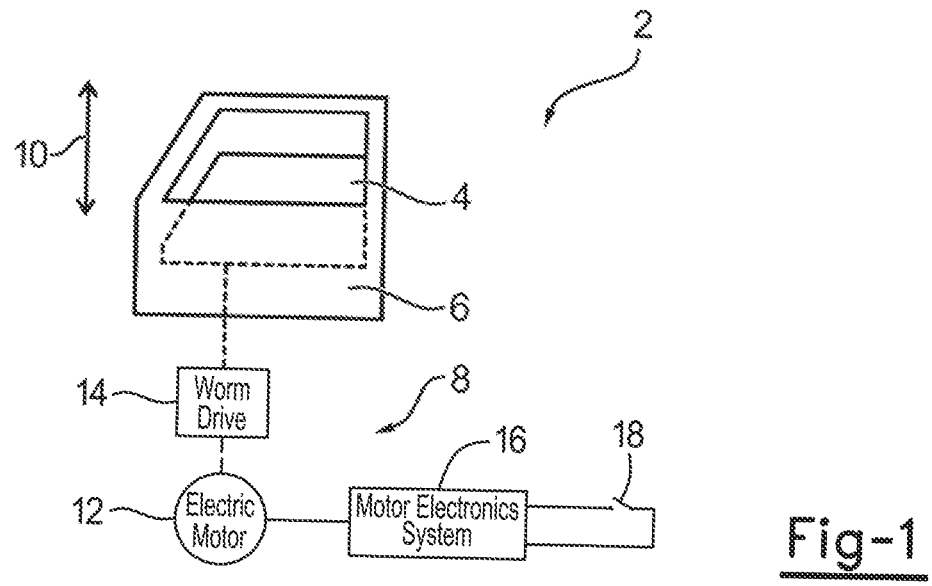
FIG. 1 shows an adjustment drive of a motor vehicle window with a mechanically commutated electric motor.

During the course of a rotor rotation, one commutator segment and two commutator segments may be alternately contacted by utilizing a brush element. In known motors, the current ripple of the guided load current or motor current, because of different armature resistance, is determined. The load current or motor current is usually a direct current. In other words, the electric motor is a direct current motor. In contrast to this, according to one or more embodiments of the present disclosure, an oscillating input signal, i.e. an alternating current signal, is fed into the motor path. In this case, modulation of the output signal does not only take place as a result of a changing armature resistance but may take place due to the coil windings having different currents, i.e. a variable inductance. FIG. 1 depicts a schematic and simplified depiction of an electrically operated window regulator 2 with a displaceable window pane as an adjusting part 4. In this case, the window regulator 2 is suitably incorporated in a vehicle door 6 of a motor vehicle. The adjusting part 4 is adjusted along an adjustment path 10 by utilizing an electromotive adjustment drive 8.

The adjustment drive 8 has an electric motor 12 which cooperates with a worm drive 14 on the shaft side. A rotational movement of the electric motor 12 is converted into a translatory movement of the adjusting part 4 by way of the worm drive 14. A motor electronics system 16 supplies the electric motor 12 with electrical energy as soon as a user of the motor vehicle starts an adjusting movement of the adjusting part 4 along the adjustment path 10 by operating a push button 18.

Figure 2:
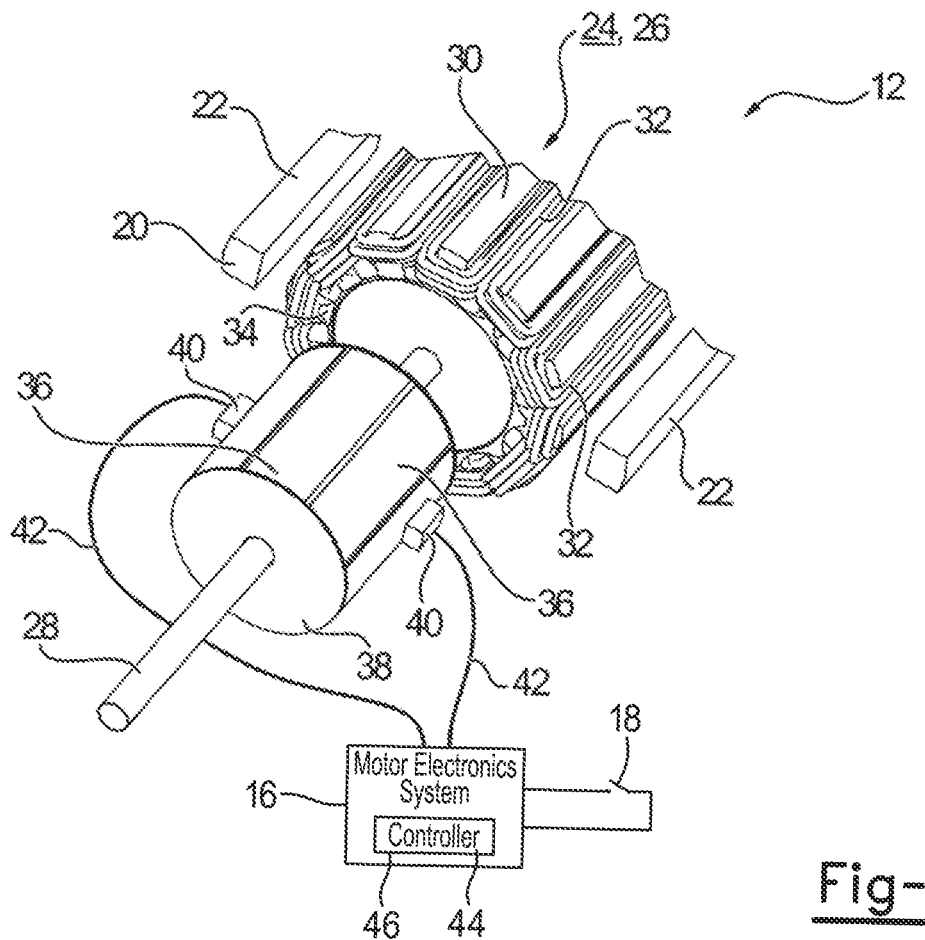
FIG. 2 shows in sections the electric motor with a rotor and with a stator.

The perspective depiction in FIG. 2 depicts in sections the electric motor 12 which is designed as an internal rotor in this exemplary embodiment. The electric motor 12 has a stator 20 with a number of permanent magnets 22, of which two are depicted in FIG. 2 by way of example. In this case, the permanent magnets 22 of the stator 20 are held in position by utilizing a (stator) lamination stack which is not depicted in greater detail. An armature 24 with a rotor 26 and with a rotor shaft 28 is arranged within the stationary stator 20, to which rotor shaft a worm wheel of the worm drive 14, which worm wheel is not shown, is attached.

The rotor 26 is provided with an electromagnetic structure 30 with a number of coil windings (rotor windings, armature windings) 32 which form the respective electromagnets. Each of the coil windings 32 is wound around a (rotor) lamination stack 34, which is fixed on the rotor shaft 28, as a coil, and is electrically contacted with two commutator segments 36 of a commutator 38. The commutator 38 is attached to the rotor shaft 28 in a torque-proof manner. In this case, the commutator segments 36 are only distinguished by their arrangement with respect to the rotor shaft 28, wherein the commutator segments 36 are each arranged offset at a constant angle to one another on the commutator 38.

The commutator 38 is electrically contacted with two (carbon) brushes or brush elements 40. During operation of the electric motor 12, the brush elements 40 brush over the commutator segments 36 by utilizing an electrically conductive rubbing contact or sliding contact. In this case, the brush elements 40 are electrically contacted with the motor electronics system 16 by utilizing a respective wire 42. The motor electronics system 16 comprises a device 44 with a controller 46 for determining a rotation variable of the rotor 26.

Figure 3:
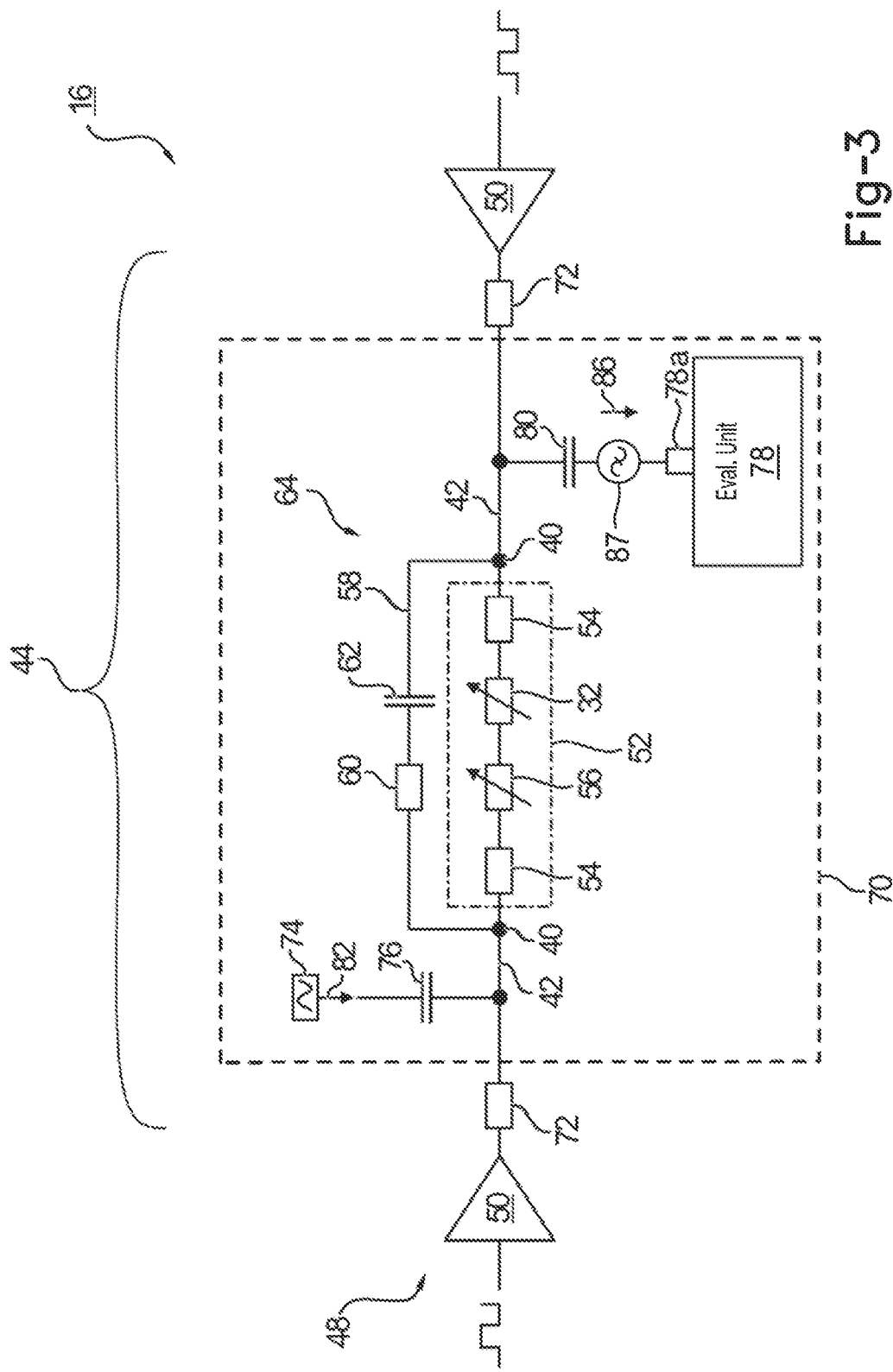
FIG. 3 shows a device for determining a rotation variable of the rotor.

The device 44 as well as a method for determining the rotation variable which is carried out by the device 44 is described in greater detail below using FIGS. 3 and 4.

The motor electronics system 16 of the mechanically commutated electric motor 12 has a direct current circuit 48 which is guided to the brush elements 40 by utilizing the wires 42. The direct current circuit has a DC to DC converter which is not depicted in greater detail, by which DC to DC converter an electrical supply voltage of a motor vehicle wiring system is converted into an operating voltage or into an operating current. In this respect, the direct current circuit 48 has two half bridges 50 which are connected to the device 44.

Figure 4:
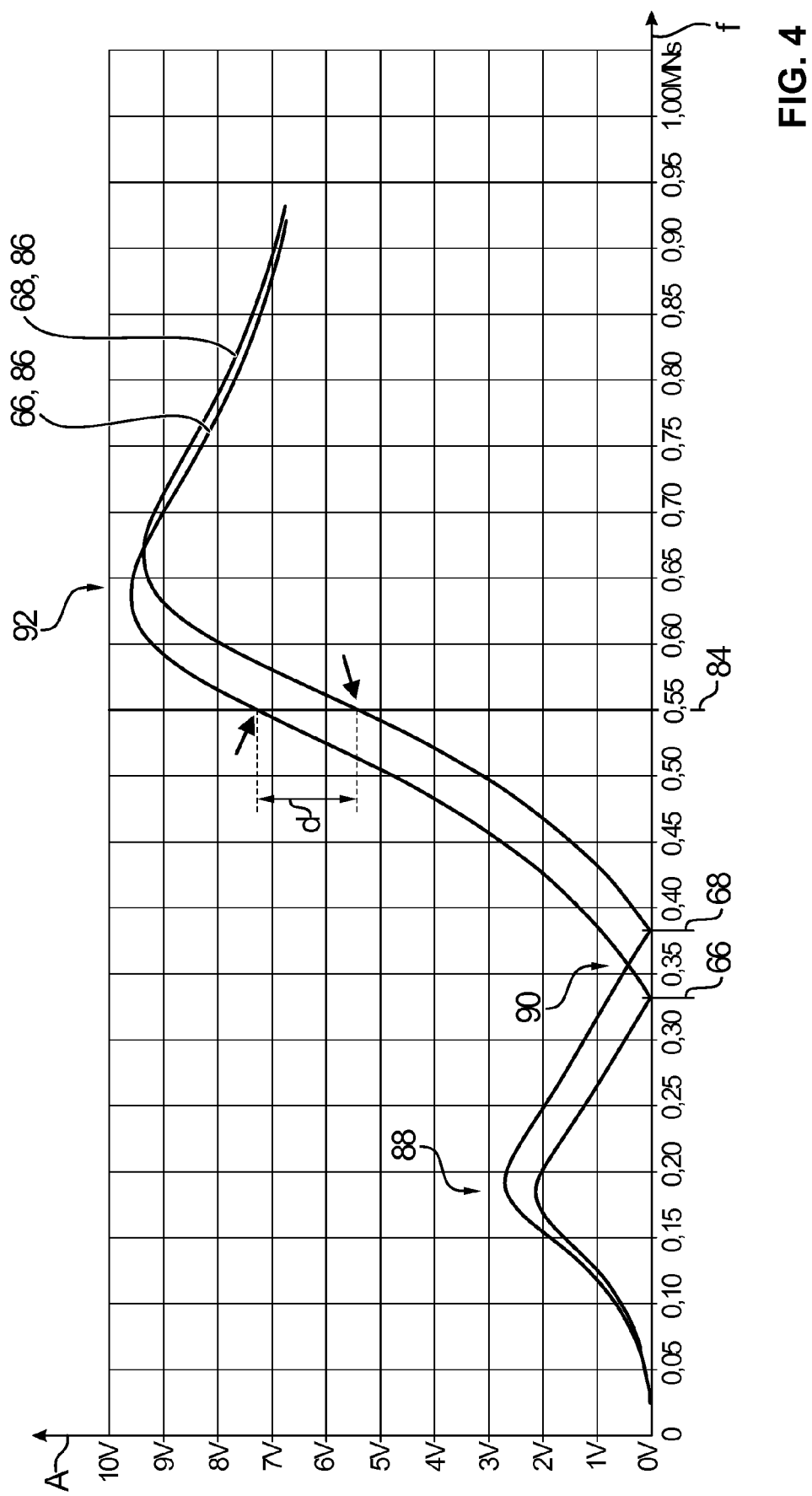
FIG. 4 shows a frequency-amplitude diagram of the device.

As can be seen comparatively clearly in the schematic depiction in FIG. 4, a motor current path 52 is formed between the two brush elements 40 of the electric motor 12. In this case, the motor current path 52 is guided via commutator segments 36, which are contacted by the brush elements 40, and coil windings 32 which are connected to these commutator segments in an electrically conductive manner.

The motor current path 52 has a motor choke 54 on each brush side. The brush elements 40 brush along the commutator segments 36 during a rotation of the armature 24 or the rotor 26 relative to the stator 20. In this case, there occurs substantially two different commutator states.

In a first commutator state, the two brush elements 40 are each electrically contacted with two of the commutator segments 36, so that two of the coils or coil windings 32 of the electromagnetic structure 30 are consequently supplied with current. In this case, the coil windings 32 are connected in parallel to one another. As a result, a coil winding 32 is in particular electrically short-circuited by a brush element 40. This causes a current increase above the normal current value of the load current or motor current of the direct current circuit 48.

As soon as the brush elements 40 are each only electrically contacted with one of the commutator segments 36, a second commutator state occurs which is characterized by a low current value. Thus, the motor current path 52 may have a variable ohmic armature resistance 56 as well as a varying inductance, owing to the different number of contacted coil windings 32.

A radio interference suppression path 58 with a resistor 60 and with a capacitor 62 is connected in parallel to the motor current path 52. The radio interference suppression circuit which is thus realized serves to suppress interference signals which can occur as a result of operating the motor. As can be seen comparatively clearly in the depiction in FIG. 3, an electrical parallel resonant circuit 64 is formed by the parallel connection of the motor current path 52 and the radio interference suppression path 58. In particular, owing to the varying inductance value of the motor current path 52, the parallel resonant circuit 64 substantially has two resonance frequencies 66 and 68 which correspond to the two commutator states of the electric motor 12.

The device 44 has a measuring circuit 70 which is connected to one of the half bridges 50 respectively by utilizing two direct current decouplings (DC decouplings) 72. In this case, the direct current decoupling 72 is in particular designed as one longitudinal choke in each case. The device 44 also has a signal generator 74 which is connected to one of the wires 42 between the direct current decoupling 72 and the parallel resonant circuit 64 by utilizing a capacitor 76. An evaluation unit 78 is connected to the other wire 42 between the parallel resonant circuit 64 and the direct current decoupling 72 by a capacitor 80. In this case, the signal generator 74 as well as the evaluation unit 78 are part of the controller 46, or at least are controlled by it.

According to the method, the signal generator 74 generates an oscillating input signal 82 during operation. In this case, the input signal 82 is in particular a substantially sinusoidal alternating current signal with a measuring frequency 84. The input signal 82 is fed into the wire 42 via the capacitor 76. Thus, the input signal 82 is fed into the parallel resonant circuit 64 as an armature current signal. The signal generator 74 is thus an additional or alternative current source apart from the direct current circuit 48.

During operation of the electric motor 12, a direct current-like load current or motor current is fed in by utilizing the direct current circuit 48 in order to drive the armature 24 or the rotor 26. This load current or motor current is added with the input signal 82 and fed into the parallel resonant circuit 64. In this case, a current ripple is imposed on the load current or motor current, in particular owing to the armature resistance 56 which varies during rotation of the rotor 26. This current ripple of the load current or motor current has a so-called ripple frequency which substantially corresponds to the rotation frequency or motor frequency of the rotating armature 24.

At the same time, a current ripple is also imposed on the alternating current-like input signal, in particular owing to the varying inductance value of the motor current path 52, and the different resonance frequencies 66, 68 which result therefrom. However, only the modulated input signal is guided as an output signal 86 to the evaluation unit 78 by way of the capacitive coupling by utilizing the capacitor 80. Owing to the signal generator 74 which acts as an additional current source, the generation of the output signal 86 is independent of the load current or motor current of the electric motor 12. In particular, it is thus possible to feed an input signal 82 into the parallel resonant circuit 64, even if the electric motor 12 is at a standstill, in the case of which no motor current flows.

The output signal 86 is guided via the capacitor 80, which is connected as a coupling capacitor, and via a high-pass filter 87 to a digital pin 78a of the evaluation unit 78. The digital pin 78a thus converts the signal edges of the output signal 86, which are brought about by the current ripple, into a digital signal for establishing the rotation variable. In this case, the additional high-pass filter 87 guarantees constant signal levels for the high (HIGH) and low (LOW) signal states of the output signal 86, so that a reliable digitalization by the pin 78a is guaranteed.

FIG. 4 depicts a frequency-amplitude diagram. A signal frequency f is applied along the horizontal axis of abscissas (x-axis). A corresponding signal amplitude A of the output signal 86 is applied along the vertical axis of ordinate (y-axis). The diagram in FIG. 4 depicts two signal curves which represent the two commutation states and are subsequently described with the help of the respective resonance frequency 66 or 68.

The signal curves 66 and 68 have substantially similar curve progressions. In the case of low signal frequencies of the input signal 82, the respective output signal 86 of the signal curves 66 and 68 has a low signal amplitude A, since the capacitive coupling of the signal generator 74 by the capacitor 76 and the evaluation unit 78 of the capacitor 80 make an effective signal transmission difficult.

With increasing signal frequency, the signal curves 66 and 68 reach a first signal maximum 88 which substantially corresponds to a high-pass effect of the capacitors 76 and 80. For further increasing signal frequencies of the input signal 82, the signal amplitude A of the output signal 86 is reduced until a signal minimum 90 is reached. In this case, the signal minimum 90 occurs at the respective resonance frequency 66, 68 of the parallel resonant circuit 64 of the motor current path 52 and the radio interference suppression 58.

For higher signal frequencies of the input signal 82, the signal amplitudes A of the output signals 86 continuously increase, until a second signal maximum 92 is reached. In this case, the signal maximum 92 corresponds to a resonance case of the device 44, i.e. the combined system made up of the motor current path 52 and the radio interference suppression path 58 as well as the longitudinal chokes of the direct current decoupling 72.

As can be seen comparatively clearly in the depiction in FIG. 4, the signal curves 66 and 68 have a substantially constant signal distance d in the frequency range between the signal minimum 90 and the signal maximum 92. This signal distance d substantially corresponds to the difference in amplitude of the output signals 86 when the first and second commutator states are excited.

In order to determine the rotation variable, in particular the rotor position and/or the rotor speed, the signal distance d is monitored by the evaluation unit 78. In other words, the evaluation unit 78 determines a relative change in amplitude of the output signal 86.

In one suitable dimensioning, the armature 24 or the rotor 26 rotates with a rotation frequency of approximately 1 kHz during operation of the motor. In this case, the coupling capacitors 76 and 80 are dimensioned in such a way that the first signal maximum 88 occurs approximately between 150 kHz and 200 kHz. In this case, the signal minimum suitably occurs at approximately 350 kHz, wherein the signal maximum 92 occurs at approximately 650 kHz. In this case, the measuring frequency 84 for generating the input signal 82 is suitably selected from the frequency range between the signal minimum 90 and the signal maximum 92. In this case, a signal frequency f is suitably selected at which the signal distance d has a maximum value. Thus, the input signal 82 or the output signal 86 have a measuring frequency 84 which may be different from the frequency of the current ripple which is generated by commutation.

The disclosure is not limited to the exemplary embodiment described above. In fact, other variations of the disclosure can also be derived therefrom by the person skilled in the art, without departing from the subject matter of the disclosure. In particular, all of the individual features which are described in relation to the exemplary embodiment can also be combined with one another in a different way, without departing from the subject matter of the disclosure.

It is thus conceivable, for example, that the input signal 82 is not generated as a continuous sinusoidal signal with the measuring frequency 84, but instead as a bit sequence of pulse-width-modulated measuring pulses, wherein each measuring pulse has a sinusoidal wave with the measuring frequency 84. Additionally or alternatively, it is also conceivable that the measuring frequency 84 is switched between a plurality of frequency values, for example. In this case, it is possible, for example, for the input signal to be periodically switched between a plurality of measuring frequencies 84, for example between four different measuring frequencies. As a result, a particularly suitable motor operation with regard to EMC requirements is realized.

The following is a list of reference numbers shown in the Figures. However, it should be understood that the use of these terms is for illustrative purposes only with respect to one embodiment. And, use of reference numbers correlating a certain term that is both illustrated in the Figures and present in the disclosure is not intended to limit the disclosure to only cover the illustrated embodiment.

LIST OF REFERENCE SYMBOLS 2 window regulator
4 adjusting part
6 vehicle door
8 adjustment drive
10 adjustment path
12 electric motor
14 worm drive
16 motor electronics system
18 push button
20 stator
22 permanent magnet 24 armature
26 rotor
28 rotor shaft
30 electromagnetic structure
32 coil winding
34 lamination stack
36 commutator segment
38 commutator
40 brush element
42 wire
44 device
46 controller
48 direct current circuit
50 half bridge
52 motor current path
54 motor choke
56 armature resistance
58 radio interference suppression path
60 resistor
62 capacitor
64 parallel resonant circuit
66 resonance frequency
68 resonance frequency
70 measuring circuit
72 direct current decoupling
74 signal generator
76 capacitor
78 evaluation unit
78a pin
80 capacitor
82 input signal
84 measuring frequency
86 output signal
87 high-pass filter
88 signal maximum
90 signal minimum
92 second signal maximum
A signal amplitude
d signal distance
f signal frequency While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. A method of determining a rotation variable of a rotatably mounted rotor of an electric motor, wherein the electric motor is mechanically commutated, the method comprising:
 feeding an oscillating input signal through a motor current path formed between two brush elements of the electric motor, wherein the motor current path is guided via commutator segments, contacting the two brush elements, and coil windings of the rotor electrically and conductively connected to the commutator segments, and wherein the motor current path is arranged electrically parallel to a radio interference suppression path including a capacitor;
 generating an output signal based on a current ripple created by mechanical commutation of the motor current path; and
 establishing the rotation variable based on the output signal.

2. The method of claim 1, wherein the feeding step includes generating the oscillating input signal at a measuring frequency, wherein the measuring frequency is selected based on an amplitude of a current ripple of the output signal being greatest.

3. The method of claim 2, wherein the feeding step includes alternately switching the measuring frequency between a plurality of frequency values.

4. The method of claim 1, wherein the input signal is generated as a sequence of measuring pulses.

5. The method of claim 1, wherein the generating step includes guiding the output signal through an evaluation unit provided with high-pass filter and a digital pin.

6. A device configured to determine a rotation variable of a rotatably mounted rotor of a mechanically commutated electric motor, the device comprising:
 a motor current path formed between two brush elements of the electric motor, wherein the motor current path is guided by commutator segments, contacted by the two brush elements, and rotor coil windings electrically and conductively connected to the commutator segments;
 a radio interference suppression path provided with a capacitor connected in parallel to the motor current path; and
 a measuring circuit provided with,
  a signal generator capacitively coupled to one of the two brush elements and configured to generate an input signal,
  an evaluation unit capacitively coupled to the other brush element and configured to evaluate an output signal.

7. The device of claim 6,
 wherein the measuring circuit is decoupled in a signal-technical manner from a direct current circuit of the electric motor by utilizing a direct current decoupling, wherein the direct current circuit is guided to the brush elements.

8. The device of claim 7,
 wherein the direct current decoupling has a longitudinal choke with a barrier effect in a range of a measuring frequency of the input signal.

9. The device of claim 6,
 wherein the output signal is guided via a high-pass filter to a digital pin of the evaluation unit.

10. An adjustment drive a motor vehicle, comprising:
 a motor current path formed between two brush elements of an electric motor, wherein the motor current path is guided by one or more commutator segments, contacted by the two brush elements, and rotor coil windings electrically and conductively connected to the commutator segments;
 a radio interference suppression path provided with a capacitor configured to reduce interference, wherein the radio interference suppression path is connected in parallel to the motor current path;
 a measuring circuit that includes a controller and a signal generator capacitively coupled to one of the two brush elements and configured to generate an input signal; and
 a microcontroller capacitively coupled to the other brush element and configured to evaluate an output signal, wherein a rotational variable is determined in response to a current ripple of the output signal.

11. The adjustment drive of claim 10, wherein the controller is an application-specific circuit.

12. The adjustment drive of claim 10, wherein the output signal is guided via a high-pass filter to the microcontroller.

13. The adjustment drive of claim 10, wherein a load current or motor current is not utilized to determine the rotational variable.

14. The adjustment drive of claim 10, wherein the input signal is fed into the motor current path as an armature current signal.

15. The adjustment drive of claim 10, wherein the input signal is generated as a result of a sequence of measuring pulses.

16. The adjustment drive of claim 10, wherein the adjustment drive includes two or more digital pins interconnected to form a resistor ladder network.

17. The adjustment drive of claim 10, wherein an alternating current path of the input signal or output signal is decoupled from a load current or motor current.

18. A method of determining a rotation variable a rotatably mounted rotor disposed in a mechanically commutated electric motor, the method comprising:
  feeding an oscillating input signal through a motor current path formed between two brush elements of the electric motor, wherein the motor current path is guided via commutator segments, contacting the two brush elements, and coil windings of the rotor electrically and conductively connected to the commutator segments;
  generating an output signal based on a current ripple created by mechanical commutation of the motor current path;
  selecting a measurement frequency based on a peak amplitude of the current ripple; and
  alternately switching the measuring frequency between a plurality of frequency values.

19. The method of claim 18, wherein the feeding step includes generating a first measurement pulse and a second measurement pulse, the selecting step includes selecting a first measurement frequency, based on first peak amplitude of a current ripple of the first measurement pulse, and a second measurement frequency based on second peak amplitude of a current ripple of the second measurement pulse, and the feeding step further includes switching between the first measurement frequency and the second measurement frequency.

* * * * *